United States Patent
Atac et al.

(10) Patent No.: US 7,146,084 B2
(45) Date of Patent: Dec. 5, 2006

(54) FIBER OPTIC LIGHT SOURCE FOR DISPLAY DEVICES

(75) Inventors: Robert Atac, Batavia, IL (US); Todd Ashcraft, Aurora, IL (US)

(73) Assignee: CMC Electronics, Inc. (CA)

( * ) Notice: Subject to any disclaimer, the term of this patent is extended or adjusted under 35 U.S.C. 154(b) by 56 days.

(21) Appl. No.: 10/462,468

(22) Filed: Jun. 16, 2003

(65) Prior Publication Data

US 2004/0252940 A1    Dec. 16, 2004

(51) Int. Cl.
*G02B 6/04* (2006.01)
*G02B 21/00* (2006.01)
*G02B 27/14* (2006.01)

(52) U.S. Cl. .................. 385/115; 385/116; 385/14; 385/1; 385/901; 385/32; 362/13; 362/34; 362/237; 362/557; 359/13; 359/630

(58) Field of Classification Search .......... 385/31, 385/115, 116, 119, 120, 133, 15, 30, 32, 901, 385/1, 2, 3, 14, 88, 89, 16, 17, 18, 24, 42; 362/13, 34, 237; 345/8; 359/13, 630; 398/111, 398/112, 113, 42, 48
See application file for complete search history.

(56) References Cited

U.S. PATENT DOCUMENTS

| | | | |
|---|---|---|---|
| 4,280,766 A | 7/1981 | Goss et al. .................. 356/350 |
| 4,467,292 A | 8/1984 | Ajioka et al. ............... 333/24.1 |
| 4,764,984 A * | 8/1988 | Franke et al. ............... 398/119 |
| 4,792,207 A | 12/1988 | Shaw et al. ............... 350/96.29 |
| 4,884,860 A | 12/1989 | Brown ..................... 350/96.15 |
| 4,989,956 A * | 2/1991 | Wu et al. ...................... 349/71 |
| 5,111,326 A | 5/1992 | Ball ............................ 359/244 |
| 5,164,848 A * | 11/1992 | Firth et al. ..................... 359/13 |
| 5,276,758 A | 1/1994 | Hughes ..................... 385/116 |
| 5,506,408 A | 4/1996 | Vickers et al. ............... 250/366 |
| 5,526,170 A | 6/1996 | Esman et al. ............... 359/279 |
| 5,534,694 A | 7/1996 | Ball et al. ................... 250/330 |
| 5,642,227 A | 6/1997 | Rallison ..................... 359/631 |
| 5,673,151 A | 9/1997 | Rallison ..................... 359/631 |
| 5,724,463 A | 3/1998 | Deacon et al. ................ 385/27 |
| 5,783,829 A | 7/1998 | Sealock et al. ............. 250/367 |
| 5,793,046 A * | 8/1998 | Jeffers et al. ............... 250/364 |
| 5,835,458 A | 11/1998 | Bischel et al. ........... 369/44.12 |
| 5,876,262 A | 3/1999 | Kelly et al. ................. 446/118 |
| 5,905,263 A * | 5/1999 | Nishizawa et al. ......... 250/368 |
| 5,911,018 A | 6/1999 | Bischel et al. ................ 385/16 |

(Continued)

FOREIGN PATENT DOCUMENTS

FR    0 280 584    *    8/1988

(Continued)

OTHER PUBLICATIONS

Web page: Fluorescent Optical Fiber (Flexible) with up to ½" Diameter (PATENTED), pp. 1-3, May 28, 2004.*

(Continued)

*Primary Examiner*—Brian M. Healy
(74) *Attorney, Agent, or Firm*—Bromberg & Sunstein LLP

(57) ABSTRACT

A light source includes at least one optical fiber having a length and first and second ends and at least one electromagnetic wave source disposed along at least a portion of the length of the fiber for transmitting electromagnetic waves through a side surface of the fiber. A reflective surface is disposed at the first end of the fiber for directing light generated within the fiber toward the second end. A heads-up display can make effective use of the light source.

41 Claims, 6 Drawing Sheets

U.S. PATENT DOCUMENTS

| | | |
|---|---|---|
| 5,912,650 A | 6/1999 | Carollo .................... 345/7 |
| 5,912,997 A | 6/1999 | Bischel et al. ............. 385/15 |
| 5,917,970 A | 6/1999 | Burns et al. ............... 385/24 |
| 5,991,087 A | 11/1999 | Rallison .................. 359/631 |
| 6,035,539 A | 3/2000 | Hollenbach et al. ........ 33/241 |
| 6,057,966 A | 5/2000 | Carroll et al. ............. 359/630 |
| 6,078,704 A | 6/2000 | Bischel et al. .............. 385/4 |
| 6,151,769 A | 11/2000 | Bliss et al. ................ 29/600 |
| 6,163,309 A | 12/2000 | Weinert ..................... 345/7 |
| 6,184,969 B1 | 2/2001 | Fergason .................. 349/196 |
| 6,194,728 B1 | 2/2001 | Bosnjakovic .......... 250/370.11 |
| 6,232,602 B1 | 5/2001 | Kerr ........................ 250/330 |
| 6,243,055 B1 | 6/2001 | Fergason .................... 345/32 |
| 6,246,049 B1 | 6/2001 | Wirthlin ................... 250/229 |
| 6,353,227 B1 | 3/2002 | Boxen ..................... 250/363.1 |
| 6,356,164 B1 | 3/2002 | Rowatt .................... 333/21 A |
| 6,384,400 B1 | 5/2002 | Albagli et al. ........ 250/214 VT |
| 6,394,585 B1 | 5/2002 | Ross ......................... 347/54 |
| 6,445,767 B1 | 9/2002 | Karellas .................... 378/98.8 |
| 6,469,822 B1 | 10/2002 | Zhu .......................... 359/316 |
| 6,470,127 B1 | 10/2002 | Voevodkin ................. 385/123 |
| 6,512,231 B1* | 1/2003 | Moy .......................... 250/368 |
| 2002/0131465 A1 | 9/2002 | Lo et al. ...................... 372/50 |
| 2003/0007087 A1* | 1/2003 | Hakamata et al. .......... 348/370 |
| 2004/0195201 A1* | 10/2004 | Chao et al. .................... 216/2 |

FOREIGN PATENT DOCUMENTS

FR      2653253      4/1991

OTHER PUBLICATIONS

Kuriki, et al., High-performance polymer optical fiber lasers and amplifiers, In *Organic Photonic Materials and DevicesII*, Proceedings of SPIE vol. 3939 (2000).

Web page: Fluorescent Optical Fiber (Flexible) with up to ½" Diameter (PATENTED), pp. 1-3, May 28, 2004.

* cited by examiner

FIBER OPTIC LIGHT SOURCE FOR DISPLAY DEVICES

TECHNICAL FIELD

The present invention relates to light sources and, in particular, to light sources and other devices employing optical fiber.

BACKGROUND ART

Standard clad optical fibers consist of a core having a high refractive index that is clad with a material having a lower refractive index. The mismatch of refractive indices sets the conditions for total internal reflection and gives the fiber its wave guiding properties. Multi-clad fibers have a second layer of cladding, applied over the standard cladding. The second layer has an even lower refractive index, thus permitting total internal reflection at a second boundary. Such internal reflection allows optical fibers to transmit light from one end of the optical fiber to the other. For example, when a light is placed on one end of a fiber, the light is transmitted to the other end of the fiber with a minimal amount of light being lost due to absorption or emission along the fiber's length. Standard optical fibers will only collect and keep light that is somewhat aligned with the axis of the fiber. This means that light that enters the fiber normal to the axis of the fiber is not transmitted to the ends of the fiber.

Scintillating and wave shifting optical fibers can absorb light entering the fiber and re-transmit light of a different wavelength. This property can be exploited when using light emitting diodes ("LEDs") or other sources to illuminate the scintillating and wave shifting optical fiber. Scintillating and wave shifting optical fibers absorb light in one or more bandwidths and re-emit light at longer wavelengths. For example, a scintillating or wave shifting optical fiber can absorb UV light and emit green light. This absorption and isotropic emission feature improves the efficiency of light collection by the fiber.

Normally, scintillating optical fibers consist of polystyrene-based core, and a polymethyl methacrylate (PMMA) cladding. The scintillating core of the fiber contains a combination of fluorescent dopants, selected to produce the desired scintillation, optical and radiation-resistant characteristics. When a photon passes into the fiber, the energy is absorbed and transferred into light of longer wavelength through excitation of the fluorescent dyes added to the plastic core. The excited light typically uniformly emits in $4\pi$ steradians. The portion of the emitted light within the total internal reflection angle of the fiber is then guided down the length of the fiber by total internal reflection from the fiber cladding due to the cladding's lower refractive index. Scintillating optical fibers are used for decoration, when used for novelty or display items, or for radiation detection, when used for industrial purposes. Such fibers are readily available from Poly-Optical Products Inc., Eljen Technology, or from Bicron, a Business Unit of Saint-Gobain Industrial Ceramics, Inc.

Projection display systems, such as heads-up displays ("HUDs") used in aircraft, use light modulators such as the digital micro-mirror devices ("DMD"), liquid crystal on silicon ("LCOS") and various liquid crystal displays ("LCDs"). Such modulators, particularly when used in a heads-up display wherein the image created must compete with sunlight, generally need a very high intensity and somewhat collimated light source. One source for such a light is a laser. However, high power lasers are not rugged or eye-safe, can be quite bulky, and are expensive. Light modulators for such displays also need nearly collimated light spread over a relatively wide aperture. Beam-spreading optics are often used to expand a laser beam into a collimated light beam of appropriate size to illuminate a light modulator. The light modulator then controls the transmission, absorption or reflection of the light to projection optics that create a real image on a screen or diffuser.

SUMMARY OF THE INVENTION

In a first embodiment of the invention there is provided a light source which includes at least one optical fiber having a length and first and second ends. The at least one optical fiber receives electromagnetic waves along at least a portion of its length and a reflective surface disposed at the first end of the fiber directs light generated within the fiber to the second end. In accordance with a related embodiment, the at least optical fiber may be a wave-shifting fiber. In accordance with another related embodiment; the at least one optical fiber may be a scintillating fiber. The light source may further include at least one electromagnetic wave source disposed along at least a portion of the length of the fiber. The at least one electromagnetic wave source transmits electromagnetic waves through a side surface of the fiber.

In accordance with a further related embodiment, the at least one optical fiber may be arranged in a sheet. Similarly, the at least one optical fiber may be arranged in a coil. In accordance with another related embodiment, the light source may also include a housing for containing the at least one optical fiber and the at least one electromagnetic wave source and the housing may include the reflective surface. The light source may also include at least one lens for receiving light emitted from the second end of the fiber. The at least one electromagnetic wave source may emit electromagnetic waves in the ultra-violet, visible or infrared range of the electromagnetic wave spectrum. In accordance with another related embodiment, the light source may also include a controller for changing the intensity of the at least one electromagnetic wave source.

In accordance with another embodiment of the invention, a display device includes at least one optical fiber having a length and first and second ends and at least one electromagnetic wave source disposed along at least a portion of the length of the fiber for transmitting electromagnetic waves through a side surface of the fiber. The at least one optical fiber generates light and transmits the light along its length upon absorbing at least a portion of the electromagnetic waves. A modulator receives light emitted from the second end of the at least one optical fiber and forms an image. The at least one optical fiber may be a wave-shifting fiber or a scintillating fiber.

In accordance with related embodiments, the display device may also include a reflective surface disposed at the first end of the at least one fiber for directing light generated within the at least one optical fiber toward the second end. Similarly, the display device may include at least one lens for receiving light emitted from the second end of the fiber and transmitting light to the modulator. The at least one electromagnetic wave source may emit electromagnetic waves in the ultra-violet, visible or infrared range of the electromagnetic wave spectrum. In accordance with another related embodiment, the display device may include a controller for changing the intensity of the at least one electromagnetic wave source and/or a screen on which the image is displayed. Further, at least one lens may receive light emitted by the modulator and transmit light to the screen. In accordance with further related embodiments, the at least one optical fiber may be arranged in a sheet. Similarly, the at least one optical fiber may be arranged in a coil.

In accordance with a further embodiment of the invention, a heads-up display includes at least one optical fiber having a length and first and second ends and at least one electromagnetic wave source disposed along at least a portion of the length of the fiber for transmitting electromagnetic waves through a side surface of the fiber. A modulator receives light emitted from the second end of the at least one optical fiber and a combining glass receives light emitted by the modulator. The combining glass is coated with a reflective coating. The at least one optical fiber may be a wave-shifting fiber or a scintillating fiber. Similarly, the at least optical fiber may be arranged in a sheet or it may be arranged in a coil.

In accordance with a related embodiment, the head-up display also includes a reflective surface disposed at the first end of the fiber for directing light generated within the fiber toward the second end. The heads-up display may further include at least one lens for receiving light emitted from the second end of the fiber and transmitting light to the modulator. In accordance with a further related embodiment, the heads-up display may also include a diffuser for receiving light emitted from the modulator and transmitting light to the combining glass and/or at least one lens for receiving light emitted from the diffuser and transmitting light to the combining glass. In accordance with another related embodiment, the at least one optical fiber absorbs electromagnetic waves in the ultra-violet range of the electromagnetic wave spectrum and emits green light.

In accordance with another embodiment of the invention, a light source includes at least one optical fiber having a length and first and second ends and at least one electromagnetic wave source disposed along at least a portion of the length of the fiber for transmitting electromagnetic waves through a side surface of the fiber. The at least one optical fiber generates light and transmits the light along its length upon absorbing at least a portion of the electromagnetic waves. The light source also includes means for changing the intensity of light emitted from the second end of the fiber. In accordance with related embodiments, the at least one optical fiber may be a wave-shifting fiber or a scintillating fiber. Further, the means for changing the intensity of light emitted from the second end of the at least one optical fiber may include dimming the at least one electromagnetic wave source. In accordance with a further related embodiment, the light source includes at least two electromagnetic wave sources and the means for changing the intensity of light emitted from the second end of the at least one fiber includes selectively turning the electromagnetic wave sources off or on.

In accordance with a further embodiment of the invention, a method for producing light for a display includes transmitting at least one electromagnetic wave to at least one optical fiber, the at least one optical fiber having a length and first and second ends, such that the at least one electromagnetic wave is received along at least a portion of the length of the fiber. The light transmitted from either the first or second end of the at least one optical fiber is then reflected back into the fiber.

In accordance with another embodiment of the invention, a light source includes at least one doped glass device having a length and first and second ends. The at least one doped glass device receives at least one electromagnetic wave along at least a portion of its length, and a reflective surface disposed at the first end of the at least one doped glass device directs light generated within the doped glass device to the second end. In accordance with related embodiments, the at least one doped glass device may include a glass device doped with a lanthanide. In accordance with further related embodiments, the at least one doped glass device may include a doped glass rod. The at least one doped glass device may be arranged in a sheet or arranged in a coil. The lanthanide may be Europium or Terbium.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

As used here, the term "wave shifting fiber" refers to an optical fiber which absorbs an electromagnetic wave and emits an electromagnetic wave having a wavelength longer than the wavelength of the electromagnetic wave absorbed. Wave shifting fibers have an indefinite half life within a specified operation and temperature range. They can typically absorb electromagnetic waves anywhere within the ultra-violet to infrared range of the electromagnetic spectrum.

"Scintillating fiber" refers to an optical fiber which absorbs an electromagnetic wave having any wavelength and emits an electromagnetic wave having a wavelength longer than the wavelength of the electromagnetic wave absorbed. Scintillating fibers have a shorter half life than wave shifting fibers.

Figure 1:
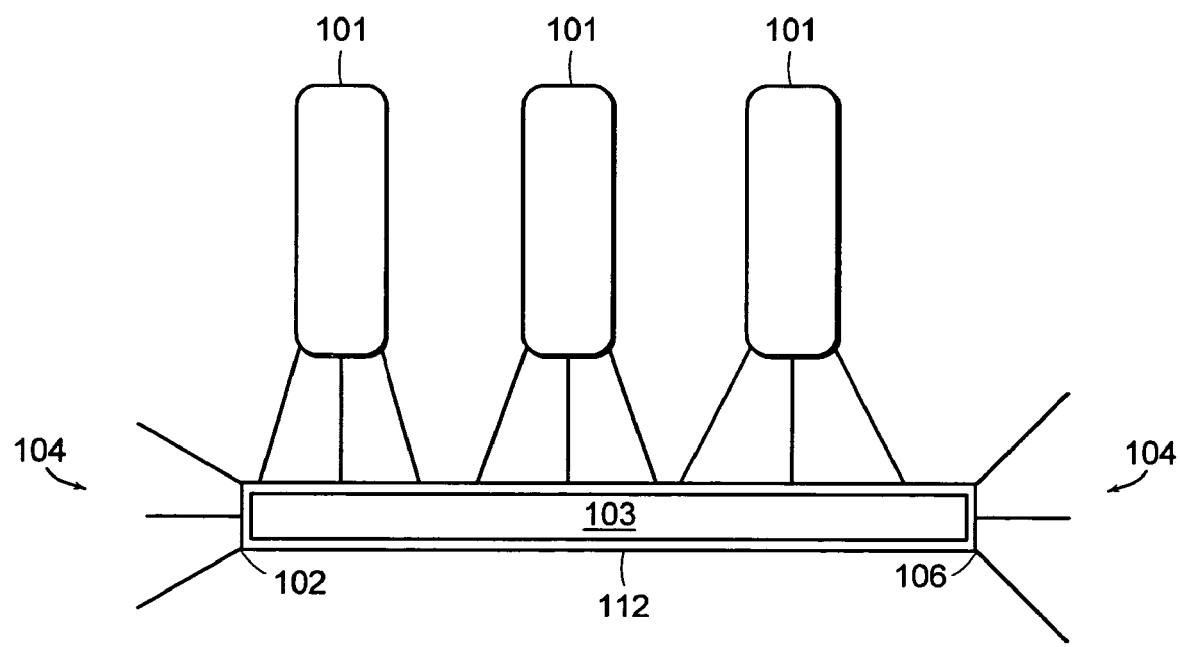
FIG. 1 is a graphical illustration of an optical fiber having scintillating or wave shifting properties wherein the fiber is illuminated along its length.

FIG. 1 is a graphical illustration of an optical fiber having scintillating or wave shifting properties wherein the fiber is illuminated along at least a portion of its length rather than through one of the ends 106 and 102 of the fiber. Electromagnetic waves from electromagnetic wave sources 101 are absorbed through the sides 112 (or circumference) of the fiber 103 which causes light 104 to be emitted from the ends of the fiber 103. Electromagnetic waves emitted from the electromagnetic wave sources 101: may be in the ultraviolet, visible or infrared ranges of the electromagnetic wave spectrum. (Although three electromagnetic wave sources 101 are illustrated in connection with FIGS. 1–5, any number of electromagnetic wave sources 101 may be disposed anywhere along the circumference 112 of the fiber 103.

Figure 2:
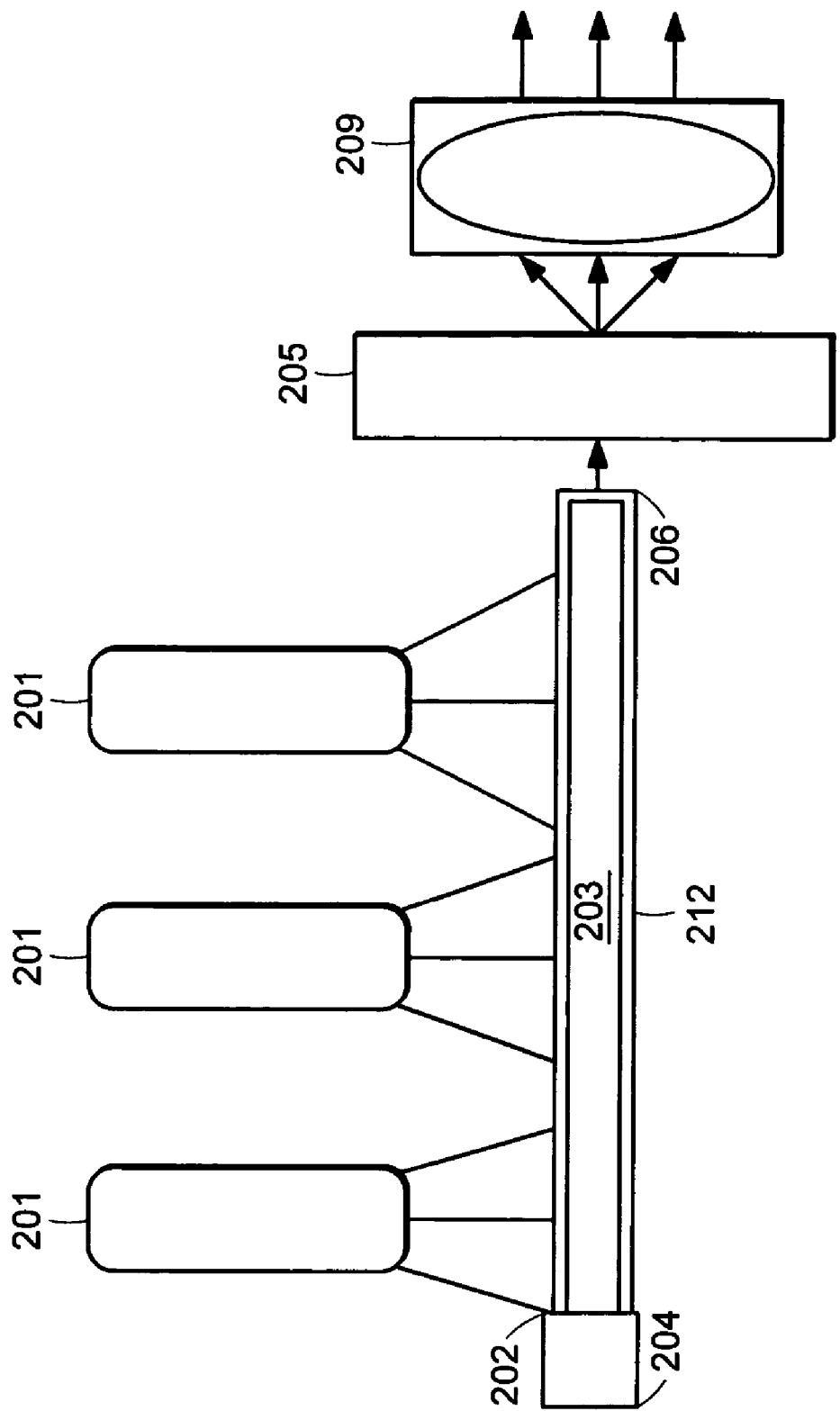
FIG. 2 is graphical illustration of a light source in accordance with an embodiment of the present invention.

FIG. 2 is a graphical illustration of a light source in accordance with an embodiment of the present invention. The light source includes one or more optical fibers 203 having wave-shifting or scintillating properties. In accordance with this embodiment of the invention, the optical fiber 203 is cylindrical, and the diameter of the individual fiber (or array of fibers) 203 defines the diameter of the initial aperture of the light source. However, the cross sectional shape of the fiber 203 is arbitrary in that it may be circular, square, rectangular or any other geometric shape. The aperture of the light source may be expanded or reduced with conventional imaging or non-imaging optical elements 205. Each fiber 203 can be made with clear, fluorescent, scintillating, or other wavelength shifting compounds.

In accordance with another embodiment of the invention, a doped glass device may be used in lieu of the optic fiber 203. For example, a glass rod doped with any one of the elements of the lanthanide series which fluoresces, for example, Europium or Terbium, may be substituted for the optical fiber.

When using a plurality of optical fibers, the fibers may be arranged as sheet, a matrix of identical optical fibers, as a matrix of individually colored optical fibers, or a matrix of broad-spectrum (e.g., white light) colored optical fibers. Such matrices may be enclosed in a cladding or jacket as is known in the art. Further, the fiber 203 may be arranged in a coil. Similarly, the doped glass device may be formed a rod, a sheet, a matrix of doped glass devices or as a coil.

The optical fiber (or doped glass device) 203 is illuminated along at least a portion of the length of the fiber 203, instead of only through ends 206 and 202 of the fibers as is commonly practiced. Light is transmitted through a side surface of the optical fiber. In the case of a cylindrical fiber or a doped glass rod, the fiber or doped glass is illuminated through the circumference 212 as shown in FIG. 2, and in the case of a rectangular fiber or doped glass device, the fiber or doped glass device may be illuminated through one or more of its sides. In this manner, the optical fiber 203 or doped glass device is able to capture electromagnetic waves from the one or more wave sources 201 and transmit light to one or both of the ends 206 and 202 in order to create a light source at each of the ends 206, and 201 of the fiber 203 or doped glass device. In the case of both wave shifting and scintillating optical fibers, broad-band illumination devices such as broad-band ultra-violet Light-Emitting-Diodes ("LEDs"), or broad-band white LEDs, or broad-band infrared LEDs, or any combination of illuminating devices can be used as the electromagnetic wave sources 201 to illuminate the fiber. Similarly, the electromagnetic wave sources 201 may include solar sources, such as direct or channeled sunlight.

If the optical fiber 203 or doped glass device and the one or more electromagnetic wave sources 201 are contained within a housing (not shown) that will reflect the electromagnetic waves that are not absorbed by the fiber 203 back into the fiber 203, then more of the electromagnetic waves from each source 201 can be absorbed by the fiber or 203 or doped glass device. Further, since many applications only need light from one end, such as end 206, a reflective surface (such as a mirror or reflective coating) 204 may placed at the other end 202 of the optical fiber 203 or doped glass device to reflect light back into the fiber 203 for transmission to end 206. The mirror or reflective coating 204 prevents the loss of generated light initially directed away from the output end 206 by redirecting it toward the output end 206. Because many dopants do not re-absorb the light at the emitted wavelength, the light will travel the length of the fiber 203 with minimal loss to end 206. A collimator or collimating imaging or non-imaging lens 209 may be used to capture light from diffusion device 205 to collimate and expand the light in accordance with a desired aperture.

Figure 3:
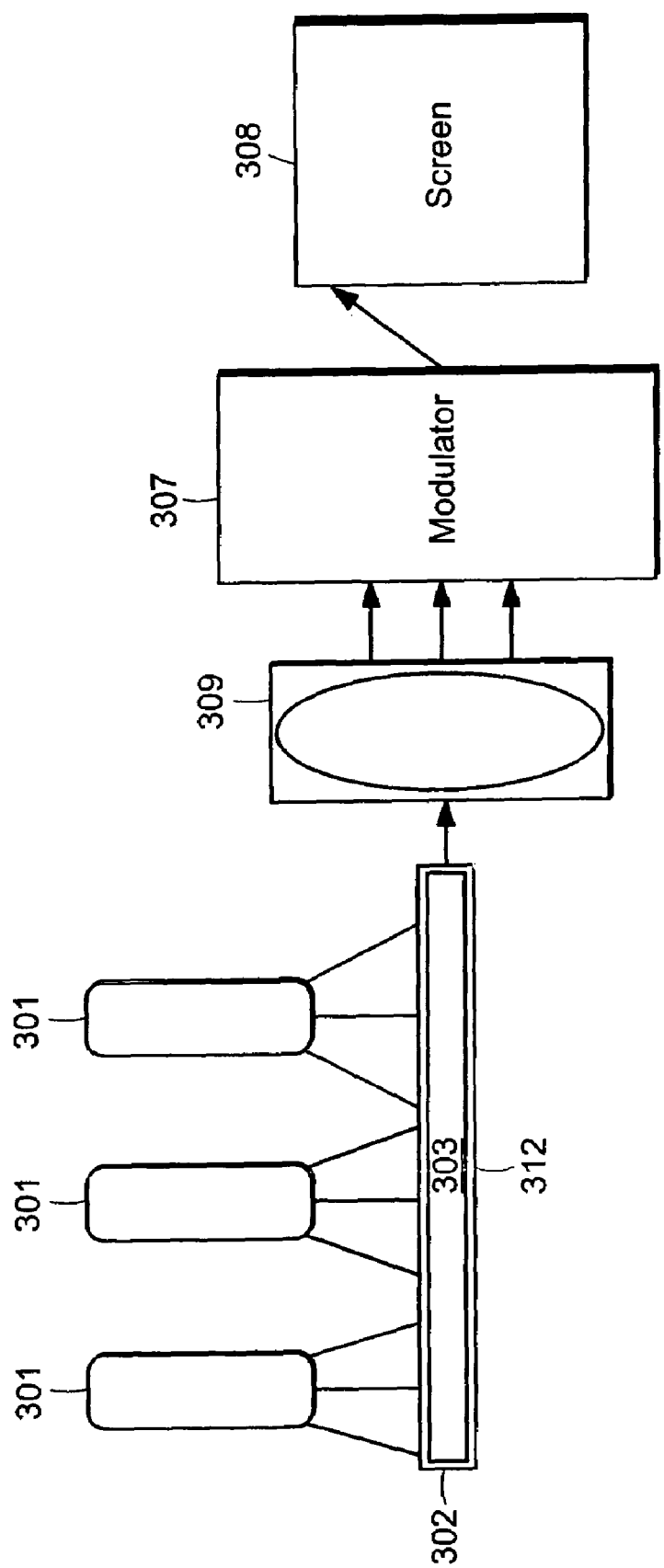
FIG. 3 is a graphical illustration of a display device in accordance with another embodiment of the invention.

FIG. 3 is a graphical illustration of a display device in accordance with another embodiment of the invention. The display device includes one or more optical fibers 303 having wave-shifting or scintillating properties and one or more electromagnetic wave sources 301 arranged to provide illumination along at least a portion of the length of the fibers 303 in the manner described with respect to FIG. 2. (Here again, a doped glass device as described above may be substituted for the optical fiber) The entire length or any portion of the length may be illuminated through any or all sides 312 of the fiber 303. Light emitted from the fiber 303 is collected and re-imaged by relay optics 309 to the correct beam size and divergence angle. The modulator 307 may include but is not restricted to a digital micro-mirror device ("DMD"), liquid crystal on silicon device ("LCOS") or any one of various liquid crystal display devices ("LCDs).

Figure 4:
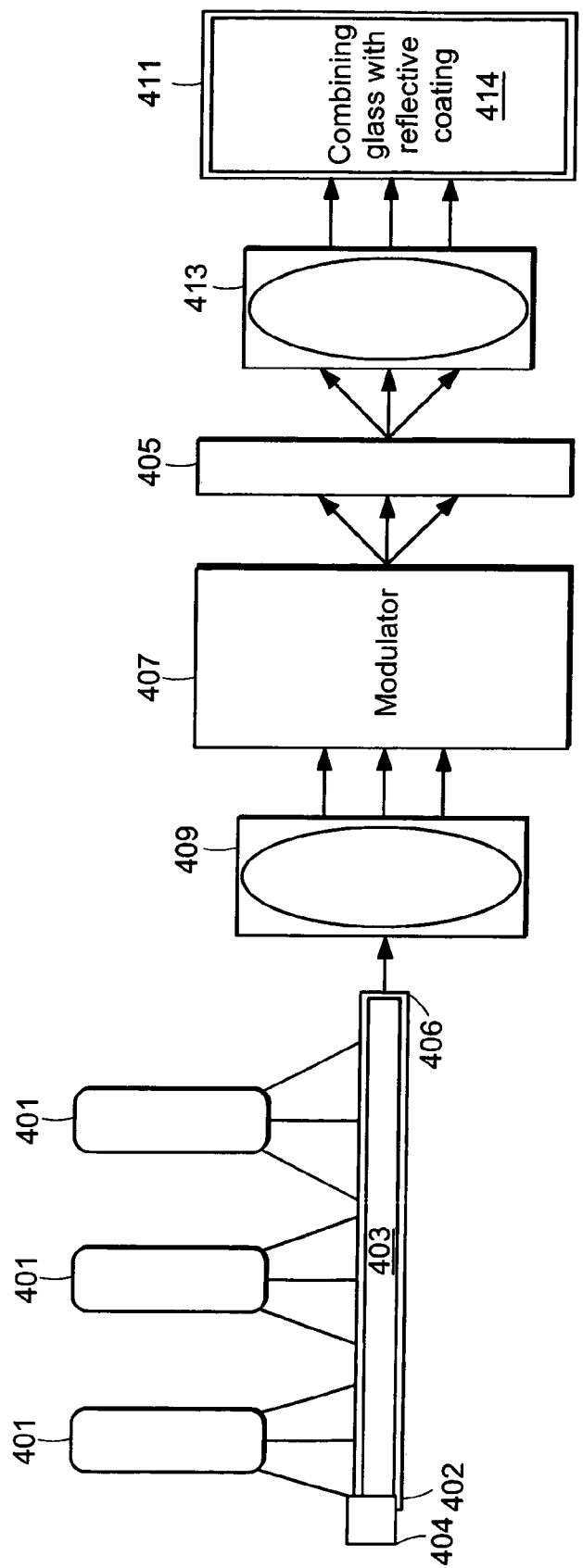
FIG. 4 is a graphical illustration of a Heads-up display in accordance with a further embodiment of the invention.

The image from the modulator 307 could be re-imaged onto a diffuser screen 308 to increase the numerical aperture and thus the viewing angle. The screen 308 may be glass, plastic or other lambertian diffusers. Additional lenses or relay optics may be disposed between the modulator and diffusion screen to, for example, manipulate the image to the desired size and/or focus. For a conventional heads-up display (as shown in FIG. 4), the image from the diffuser screen 308 or modulator 307 may be projected through head-up optics or projected through conventional optics onto a combiner. Imaging fiber optic bundles could also be used to bring the modulated image to the heads-up optics. A reflective surface such as reflective surface or coating 204 may be placed at one end 302 of the fiber 303 to reflect light back into the fiber as shown in FIG. 2. Referring now to FIG. 4, it is seen that light from the screen may be projected onto a combining glass 414, or translucent surface as in a heads-up display. Such a heads-up display may be mounted in a helmet or in the cockpit of an aircraft or elsewhere as is known in the art. As in the display described in accordance with FIG. 3 above, the heads-up display includes one or more optical fibers 403 having wave-shifting or scintillating properties (or one or more doped glass devices as described above) and one or more electromagnetic wave sources 401 arranged along at least a portion of the length of the fibers. As noted in the embodiments above, a reflective surface or coating 404 may be placed at one end 402 of the fiber to reflect light back into the fiber 403. Light emitted from the other end 406 of the fiber 403 is collected and re-imaged by relay optics 409 to the correct beam size and divergence angle. A modulator 407 forms an image via diffuser 405 and projection, relay or heads-up optics 413 then projects the light to a combining glass 414 which has at least a partially reflective coating 411.

Figure 5:
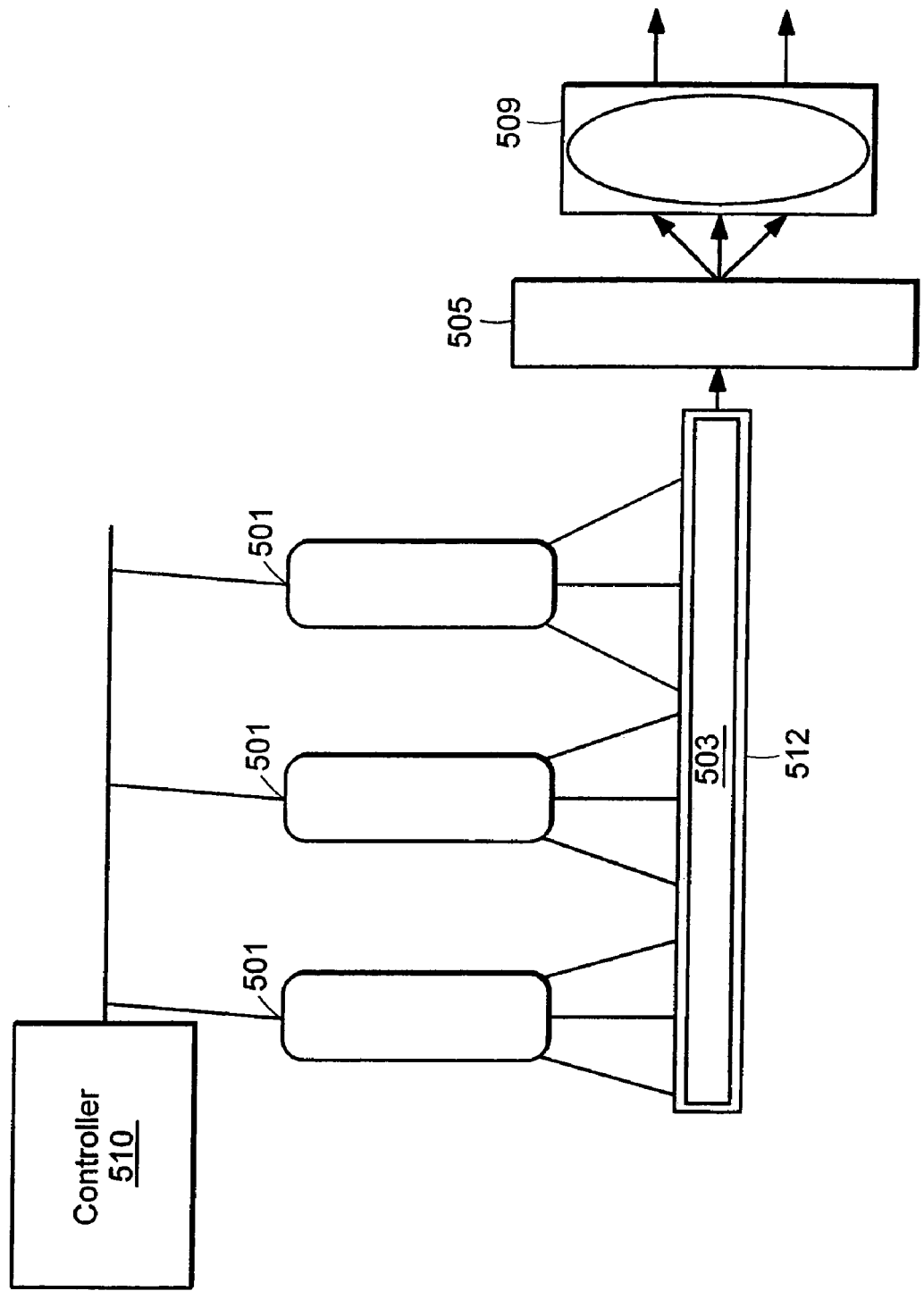
FIG. 5 is a graphical illustration of a light source in accordance with another embodiment of the invention.

The light intensity from the optical fiber is directly proportional to the intensity of the electromagnetic wave source. Thus, as the electromagnetic wave source is dimmed, the amount of light emitted at the end of the optical fiber will reduce. Conversely, as the electromagnetic wave source intensifies, the amount of light emitted at the end of the fiber will increase. FIG. 5 is a graphical illustration of a light source in accordance with another embodiment of the invention. In accordance with this embodiment; the light source includes at least one optical fiber 503 (or one or more doped glass device) with one or more electromagnetic wave sources 501 disposed along at least a portion the length of the fiber 503 for transmitting electromagnetic waves to the fiber. Means for changing the intensity of light emitted from the other end of the fiber 503 may include a controller 510 for dimming the electromagnetic wave sources 501, either individually or as a group. Additionally, a variable aperture 505 could be used with the illumination optics 509 to further control the fiber source intensity. Further, one or more of the electromagnetic wave sources may be selectively turned on or off to vary the intensity of the light emitted by the optical fiber or doped glass device.

Figure 7:
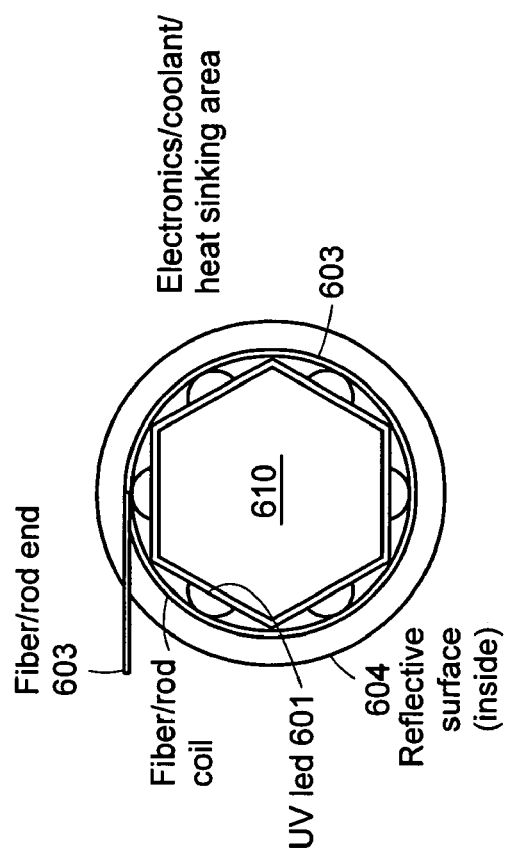
FIG. 7 is a cross sectional view of the light source of FIG. 6.
Figure 6:
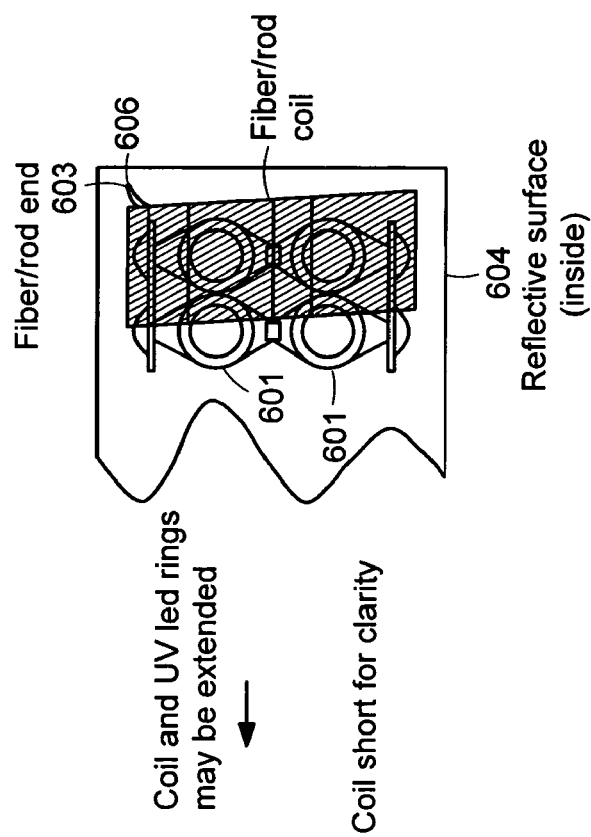
FIG. 6 is a graphical illustration of a side view of light source in accordance with a further embodiment of the invention.

FIG. 6 and is a graphical illustration of a side view of a light source in accordance with another embodiment of the invention and FIG. 7 is a cross sectional view of the embodiment of FIG. 6. A cylindrical optical fiber or doped glass rod is arranged in a coil 603 about one or more electromagnetic wave sources 601. In this embodiment, the electromagnetic wave sources 601 include ultra-violet LED rings. A reflective surface 604 surrounds the optical fiber or doped glass coil 603. The reflective surface 604 prevents the loss of generated light initially directed away from the output end 606 by redirecting it back into the coil. By arranging the optical fiber or doped glass rod in a coil, an empty area 610 is formed in the interior of the coil 603 which may provide a heat sink. The area 610 may include some type of solid or fluid coolant such as a metal heat sink or a refrigerant to keep the light source from overheating. Alternatively, the area 610 may include additional electronics such as electronics to power and control the light source and/or modulator. In FIG. 6, the coil 603 is shown relatively short in order to clarify drawing of the inner components, however, both the coil 603 and the ultra-violet LED rings may be extended to increase the output of the assembly.

The light sources and devices described above are capable of producing high intensity light, in the range of 5,000–50,000 ft. lamberts (more particularly, 5,000–20,000 ft. lamberts), for a heads-up display without the use of lasers. Consequently, damage to human eyes as caused by lasers is avoided and competition from sunlight is nullified. Since wave-shifting and scintillating fibers are temperature invariant, the light sources described above are not affected by variations in temperatures. Additionally, by employing wave-shifting fibers as the optical fibers or one or more doped glass devices in the light source, a heads-up or other display device may last anywhere from 10,000–25,000 hours. It is also possible to couple ambient sunlight into the fiber to assist in increasing display brightness in bright daylight.

Although, in the devices and methods described herein above, electromagnetic wave sources are described as LEDs, other types of electromagnetic wave sources may be used, such as incandescent or fluorescent bulbs or lamps, or when the fiber comprises scintillating fibers, electron guns, Kaufman guns, or any apparatus that produces electromagnetic waves having wavelengths smaller than those in the ultra violet range of the electromagnetic wave spectrum. For example, the electromagnetic wave sources may even be an ultra-violet laser as the electromagnetic waves from such an ultra-violet laser will be absorbed by the optical fiber or doped glass material and re-emitted. Further it will be appreciated that the light sources described above may be used in a variety of projected displays, particularly those that must be very bright, such as aircraft heads-up displays, helmet-mounted displays, cockpit displays, computer projectors, cinematic projectors, etc. Further such displays can all utilize light modulators such as an LCD to create an image.

It will be further understood by one of ordinary skill in the art that other modifications can be made without departing from the spirit and the scope of the invention, as set forth in the claims below.

What is claimed is:

1. A heads-up display comprising:
   at least one optical fiber having a length and first and second ends;
   at least one electromagnetic wave source disposed along at least a portion of the length of the fiber for transmitting electromagnetic waves through a side surface of the fiber, wherein the at least one electromagnetic wave source is an ultra-violet light emitting diode, a white light emitting diode, an infra-red light emitting diode or a combination thereof;
   a modulator for receiving light emitted from the second end of the fiber;
   a combining glass for receiving light emitted by the modulator, the combining glass being coated with a reflective coating; and
   a diffuser for receiving light emitted from the modulator and transmitting light to the combining glass.

2. A heads-up display according to claim 1, wherein the at least one optical fiber is a wave-shifting fiber.

3. A heads-up display according to claim 1, wherein the at least one optical fiber is a scintillating fiber.

4. A heads-up display according to claim 1, wherein the at least one optical fiber is arranged in a sheet.

5. A heads-up display according to claim 1, further comprising a reflective surface disposed at the first end of the at least one fiber for directing light generated within the fiber toward the second end.

6. A heads-up display according to claim 1, further comprising at least one lens for receiving light emitted from the second end of the at least one fiber and transmitting light to the modulator.

7. A heads-up display according the claim 1, wherein the at least one optical fiber absorbs electromagnetic waves in the ultra-violet range of the electromagnetic wave spectrum and emits green light.

8. A heads-up display according to claim 1, wherein the at least one optical fiber is arranged in a coil.

9. A light source comprising:
   at least one optical fiber having a length and first and second ends;
   at least one electromagnetic wave source disposed along at least a portion of the length of the fiber for transmitting electromagnetic waves through a side surface of the fiber, wherein the at least one electromagnetic wave source is an ultra-violet light emitting diode, a white light emitting diode, an infra-red light emitting diode or a combination thereof, the optical fiber generating light and transmitting the light along its length upon absorbing at least a portion of the electromagnetic waves; and
   means for changing the intensity of light emitted from the second end of the fiber.

10. A light source according to claim 9, wherein the at least one optical fiber is a wave-shifting fiber.

11. A light source according to claim 9, wherein the at least one optical fiber is a scintillating fiber.

12. A light source according to claim 9 comprising:
   at least one optical fiber having a length and first and second ends;

at least one electromagnetic wave source disposed along at least a portion of the length of the fiber for transmitting electromagnetic waves through a side surface of the fiber, the optical fiber generating light and transmitting the light along its length upon absorbing at least a portion of the electromagnetic waves; and means for changing the intensity of light emitted from the second end of the fiber, wherein the means for changing the intensity of light emitted from the second end of the at least one fiber includes dimming the at least one electromagnetic wave source.

13. A light source comprising:

at least one optical fiber having a length and first and second ends;

at least one electromagnetic wave source disposed along at least a portion of the length of the fiber for transmitting electromagnetic waves through a side surface of the fiber, the optical fiber generating light and transmitting the light along its length upon absorbing at least a portion of the electromagnetic waves;

means for changing the intensity of light emitted from the second end of the fiber, and at least two electromagnetic waves sources and wherein the means for changing the intensity of light emitted from the second end of the at least one optical fiber includes selectively turning the electromagnetic wave sources off or on.

14. A method for producing light for a display, the method comprising:

transmitting at least one electromagnetic wave to at least one optical fiber, the at least one optical fiber having a length and first and second ends, such that the at least one electromagnetic waves is received along at least a portion of the length of the fiber;

reflecting light transmitted to the first end of the at least one optical fiber back into the fiber; and forming an image on the display with light transmitted from the second end of the at least one optical fiber.

15. A light source for a display comprising:

at least one doped glass device having a length and first and second ends, the at least one doped glass device receiving electromagnetic waves along at least a portion of its length; afid a reflective surface disposed at the first end of the doped glass device for directing light generated within the doped glass device to the second end; and an image generator for receiving light from the second end of the doped glass device.

16. A light source according to claim 15, wherein the at least one doped glass device includes a glass device doped with a lanthanide.

17. A light source according to claim 16, wherein the at least one doped glass device is doped with Europium.

18. A light source according to claim 16, wherein the at least one doped glass device is doped with Terbium.

19. A light source according to claim 15, wherein the at least one doped glass device includes a doped glass rod.

20. A light source according to claim 15, wherein the at least one doped glass device is arranged in a sheet.

21. A light source according to claim 15, wherein the at least one doped glass device is arranged in a coil.

22. A heads-up display according to claim 1, wherein the heads-up display is mounted in a helmet.

23. A heads-up display according to claim 1, wherein the heads-up display is mounted in the cockpit of an aircraft.

24. A heads-up display comprising:

at least one optical fiber having a length and first and second ends;

at least one electromagnetic wave source disposed along at least a portion of the length of the fiber for transmitting electromagnetic waves through a side surface of the fiber, wherein the at least one electromagnetic wave source is an ultra-violet light emitting diode, a white light emitting diode, an infra-red light emitting diode or a combination thereof at least one lens for receiving light emitted from the second end of the at least one fiber and transmitting light to a modulator; and a combining glass for receiving light emitted by the modulator, the combining glass being coated with a reflective coating.

25. A heads-up display according to claim 24, further comprising a diffuser for receiving light emitted from the modulator and transmitting light to the combining glass.

26. A heads-up display according to claim 24, wherein the at least one optical fiber is a wave-shifting fiber.

27. A heads-up display according to claim 24, wherein the at least one optical fiber is a scintillating fiber.

28. A heads-up display according to claim 24, wherein the at least one optical fiber is arranged in a sheet.

29. A heads-up display according to claim 24, further comprising a reflective surface disposed at the first end of the at least one fiber for directing light generated within the fiber toward the second end.

30. A heads-up display according the claim 24, wherein the at least one optical fiber absorbs electromagnetic waves in the ultra-violet range of the electromagnetic wave spectrum and emits green light.

31. A heads-up display according to claim 24, wherein the at least one optical fiber is arranged in a coil.

32. The heads-up display according to claim 1, wherein the at least one electromagnetic wave source is a plurality of light emitting diodes.

33. The heads-up display according to claim 32, wherein the at least one electromagnetic wave source is a ring of light emitting diodes that surround the at least one optical fiber.

34. A heads-up display comprising:

at least one optical fiber having a length, a side surface, a first end and a second end, wherein the at least one optical fiber is arranged in a coil, the coil forming an interior area;

at least one electromagnetic wave source disposed in the interior area along at least a portion of the length of the optical fiber for transmitting electromagnetic waves through the side surface of the optical fiber;

a modulator for receiving light emitted from the second end of the optical fiber;

a combining glass for receiving light emitted by the modulator, the combining glass being coated with a reflective coating; and a coolant disposed in the interior area.

35. The heads-up display according to claim 34 further comprising an annular reflective surface that surrounds at least a portion of the coil.

36. The heads-up display according to claim 34 further comprising electronics disposed in the interior area for controlling the at least one electromagnetic wave source, the modulator, or both.

37. The heads-up display according to claim 34 further comprising electronics disposed in the interior area for powering the at least one electromagnetic wave source, the modulator, or both.

38. The heads-up display according to claim 34, wherein the at least one electromagnetic wave source is an ultra-violet light emitting diode, a white light emitting diode, an infra-red light emitting diode or a combination thereof.

39. The heads-up display according to claim 38, wherein the at least one electromagnetic wave source is a plurality of light emitting diodes.

40. The heads-up display according to claim 39, wherein the plurality of light emitting diodes is formed in a ring.

41. A heads-up display comprising:
- at least one optical fiber having a length, a side surface, a first end and a second end, wherein the at least one optical fiber is arranged in a coil, the coil forming an interior area;
- at least one electromagnetic wave source disposed in the interior area along at least a portion of the length of the optical fiber for transmitting electromagnetic waves through the side surface of the optical fiber;
- a modulator for receiving light emitted from the second end of the optical fiber;
- a combining glass for receiving light emitted by the modulator, the combining glass being coated with a reflective coating; and
- an annular reflective surface surrounding at least a portion of the coil to reflect the electromagnetic waves back into the at least one optical fiber.

* * * * *

UNITED STATES PATENT AND TRADEMARK OFFICE
CERTIFICATE OF CORRECTION

PATENT NO. : 7,146,084 B2 Page 1 of 1
APPLICATION NO. : 10/462468
DATED : December 5, 2006
INVENTOR(S) : Robert Atac et al.

It is certified that error appears in the above-identified patent and that said Letters Patent is hereby corrected as shown below:

Col. 8, line 65
replace "source according to claim 9 comprising"
with --source comprising--.

Col. 9, line 44
replace "its length; afid"
with --its length;--.

Col. 10, line 10
replace "combination thereof"
with --combination thereof;--.

Signed and Sealed this

Thirtieth Day of January, 2007

JON W. DUDAS
*Director of the United States Patent and Trademark Office*